United States Patent
Morgan et al.

(10) Patent No.: US 9,591,797 B2
(45) Date of Patent: Mar. 14, 2017

(54) COVER SYSTEMS WITH FUSION WELDS

(71) Applicant: Industrial & Environmental Concepts, Inc., Edina, MN (US)

(72) Inventors: Michael A. Morgan, Edina, MN (US); Michael Sean Gallant, Edina, MN (US)

(73) Assignee: INDUSTRIAL & ENVIRONMENTAL CONCEPTS, INC., Edina, MN (US)

(*) Notice: Subject to any disclaimer, the term of this patent is extended or adjusted under 35 U.S.C. 154(b) by 2 days.

(21) Appl. No.: 14/080,658

(22) Filed: Nov. 14, 2013

(65) Prior Publication Data

US 2015/0129590 A1 May 14, 2015

(51) Int. Cl.
| | | |
|---|---|---|
| B65D 88/34 | (2006.01) | |
| E04H 4/10 | (2006.01) | |
| A01C 3/02 | (2006.01) | |
| C02F 103/10 | (2006.01) | |
| C02F 103/20 | (2006.01) | |

(52) U.S. Cl.
CPC ............. *A01C 3/028* (2013.01); *B65D 88/34* (2013.01); *C02F 2103/10* (2013.01); *C02F 2103/20* (2013.01); *C02F 2203/002* (2013.01); *C02F 2203/006* (2013.01); *E04H 4/10* (2013.01)

(58) Field of Classification Search
CPC B65D 88/34; A01C 3/028; E04H 4/10; C02F 2203/006
USPC ............... 4/498, 503, 501; 52/169.7, 169.11, 52/169.14, 746.11, 745.06, 745.07, 52/745.08, 741.12, 741.4, 745.01; 405/129.75, 52, 53, 55; 220/FOR. 186, 220/359.1, 359.3, 359.4, 216, 220, 221, 220/222; 210/DIG. 9, 747.2, 747.9, 210/170.02, 170.09
See application file for complete search history.

(56) References Cited

U.S. PATENT DOCUMENTS

| | | | |
|---|---|---|---|
| 2,952,024 A | 9/1960 | Bartolucci | 4/503 |
| 3,313,443 A | 4/1967 | Dial et al. | 220/26 |
| 3,330,118 A | 7/1967 | Biais | 61/0.5 |
| 3,572,506 A | 3/1971 | Bandy, Jr. et al. | 210/86 |
| 3,683,428 A | 8/1972 | Morris | 4/172.14 |

(Continued)

FOREIGN PATENT DOCUMENTS

| | | |
|---|---|---|
| CA | 1253266 | 4/1989 |
| CA | 2060479 | 8/1992 |

(Continued)

OTHER PUBLICATIONS

"Proposals for Pond Membrane," Nov. 8, 1984.

(Continued)

*Primary Examiner* — Sunil Singh
(74) *Attorney, Agent, or Firm* — Norton Rose Fulbright US LLP

(57) ABSTRACT

A cover system for a storage pond formed using a liner is disclosed. A cover flap, a liner flap and an anchor flap are preassembled either off-site at a factory or on-site. The anchor flap is disposed in an anchor trench and the anchor trench is backfilled. The liner is deployed and the perimeter is welded to the liner flap. The cover is deployed and the perimeter is welded to the cover flap. The above welding is preferably fusion welding and could take place in any order.

28 Claims, 4 Drawing Sheets

(56) References Cited

U.S. PATENT DOCUMENTS

| | | | |
|---|---|---|---|
| 3,862,876 A | 1/1975 | Graves | 161/44 |
| 3,933,628 A | 1/1976 | Varani | 210/12 |
| 3,943,721 A * | 3/1976 | Azalbert et al. | 405/55 |
| 3,980,199 A | 9/1976 | Kays | 220/227 |
| 3,991,900 A | 11/1976 | Burke et al. | 220/219 |
| 4,135,257 A | 1/1979 | Lof | 4/172.12 |
| 4,137,575 A | 2/1979 | Klaffke et al. | 4/172.12 |
| 4,139,117 A | 2/1979 | Dial | 220/218 |
| 4,169,050 A | 9/1979 | Serfling et al. | 210/12 |
| 4,192,025 A | 3/1980 | Hinsperger | 4/172.14 |
| 4,244,819 A | 1/1981 | Ballu | 210/242.3 |
| 4,294,589 A | 10/1981 | Zachary | 55/36 |
| 4,438,863 A | 3/1984 | Wilson et al. | 220/227 |
| 4,503,988 A | 3/1985 | Gerber | 220/219 |
| 4,603,790 A | 8/1986 | Gerber | 220/219 |
| 4,672,691 A | 6/1987 | De Garie et al. | 4/499 |
| 4,678,375 A | 7/1987 | Gagle et al. | 405/270 |
| 4,916,937 A | 4/1990 | Robertson et al. | 405/270 |
| 5,067,182 A | 11/1991 | Koelsch | 4/494 |
| 5,265,976 A | 11/1993 | Russell | 405/52 |
| 5,400,549 A | 3/1995 | Morgan | 52/23 |
| 5,505,848 A | 4/1996 | Landine et al. | 210/170 |
| 5,562,759 A | 10/1996 | Morgan et al. | 96/155 |
| 5,587,080 A | 12/1996 | Landine et al. | 210/603 |
| 5,806,252 A * | 9/1998 | Scuero | 52/169.7 |
| 6,136,194 A | 10/2000 | Vogel et al. | 210/605 |
| 7,374,059 B2 | 5/2008 | Morgan et al. | 220/216 |
| RE41,442 E | 7/2010 | Morgan et al. | 52/23 |
| 2003/0066789 A1* | 4/2003 | Morgan | B09B 1/004 210/120 |

FOREIGN PATENT DOCUMENTS

| | | |
|---|---|---|
| CA | 2116354 | 2/1994 |
| CA | 2102590 | 5/1994 |
| CA | 2173831 | 4/1995 |
| CA | 2096852 | 3/1999 |
| CA | 2323818 | 5/2001 |
| CA | 2326002 | 5/2001 |
| DE | 2004656 | 8/1971 |

OTHER PUBLICATIONS

Lemma brochure published more than one year prior to the filing date of this application.

Parsons, "On-farm biogas production," Cooperative Extension. Northeast Regional Agricultural Engineering Service, 1984.

* cited by examiner

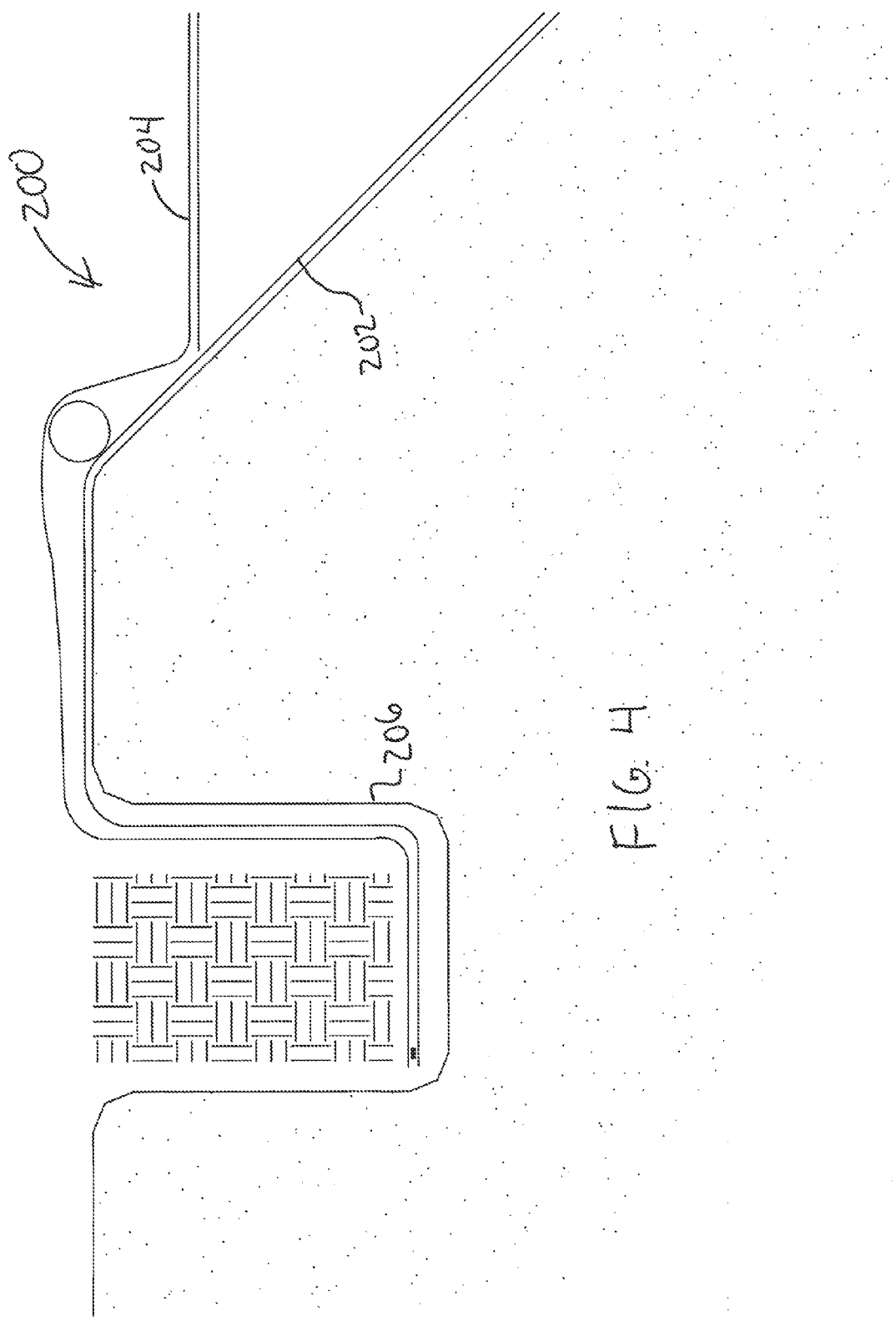

COVER SYSTEMS WITH FUSION WELDS

BACKGROUND

1. Field of the Invention

This disclosure relates generally to cover systems, and, more particularly, cover systems that include fusion welds.

2. Description of Related art

Floating cover systems are used to cover storage ponds and the like for various purposes, such as reducing evaporation, controlling rainwater, preventing contamination, controlling odor, collecting gases, etc. FIG. 1 shows one example of a prior art cover system 10 for a storage basin 12. The perimeter of storage basin 12 is formed by an earthen berm 32. A liner 14 (which is typically a geomembrane material) is deployed into storage basin 12 and extends into an anchor trench 16. Anchor trench 16 is backfilled with filler material 18 to hold liner 14 in place. Cover 20 is placed on top of liner 14. The perimeter of cover 20 is welded to the perimeter of liner 14 using an extrusion welding process at a first weld 22. A cap strip 24 is extrusion welded to liner 14 and cover 20 using second and third extrusion welds 26, 28, respectively. The purpose of the cap strip is to provide: 1) a redundant gas tight seal; and 2) a redundant mechanical connection of the cover to the liner. To avoid leakage (no leaks at all are allowed in some instances), each of first, second, and third welds 22, 26 and 28 must be substantially continuous around the entire perimeter of cover 20. A corrugated pipe 30 may be laid around the perimeter of storage basin 12 to collect any gases that collect under cover 20.

The extrusion welding process used to weld cover 20 to liner 14 is a manual process that is labor intensive and dependent upon operator skill. To achieve good quality extrusion welds, cover 20 and liner 14 must be prepared correctly. They must be cleaned to remove any contamination, ground or scraped to remove oxidation, and properly aligned and tack welded together. If not prepared correctly, or if the operator is insufficiently skilled, the welds are subject to leaks and breakage. When such welds are constructed in place at the construction site, they are susceptible to contamination from debris, and dependent upon good weather conditions. One person can test several hundred linear feet of a fusion weld in about 10 minutes with an "Air Channel Test". One person can only test about 2.5 linear feet per minute (25 linear feet/10 minutes), about $\frac{1}{10}^{th}$ of the speed of fusion weld testing.

SUMMARY

Some embodiments of the present apparatus comprise a cover, a first flap welded to the liner, a second flap welded to the cover, the second flap also welded to the first flap, and a third flap welded to either the first flap or the second flap. In some embodiments, all of the welds are fusion welds. In other embodiments, at least one of the welds is a fusion weld, or at least one of the welds is an extrusion weld. Some embodiments further comprise a liner configured so that, when the cover system is used, at least a portion of the liner will be disposed under at least a portion of the cover, and where the first flap is fusion welded to a top surface of the liner. In some embodiments, the second flap is fusion welded to a bottom surface of the cover. In some embodiments, the third flap is fusion welded to the liner flap.

Some embodiments of the present apparatus comprise a liner configured to form a storage pond, a cover configured to cover the storage pond, a liner flap welded to the liner, a cover flap welded to the cover and the liner flap, and an anchor flap welded to either the liner flap or cover flap. In some embodiments, all of the welds are fusion welds. In other embodiments, at least one of the welds is a fusion weld, or at least one of the welds is an extrusion weld. In some embodiments, the liner flap is fusion welded to a top surface of the liner. In some embodiments, the cover flap is fusion welded to a bottom surface of the cover. In some embodiments, the anchor flap is fusion welded to the liner flap.

Some embodiments of the present apparatus comprise a liner for forming a storage pond, the liner having a perimeter, a cover for covering the storage pond, the storage pond having a perimeter, and a flap preassembly comprising a liner flap, a cover flap, and an anchor flap, wherein the liner, cover and anchor flaps are welded to each other, the perimeter of the liner is welded to the liner flap and the perimeter of the cover flap is welded to the cover flap. In some embodiments, all of the welds are fusion welds. In other embodiments, at least one of the welds is a fusion weld, or at least one of the welds is an extrusion weld. In some embodiments, the liner flap is fusion welded to a top surface of the liner. In some embodiments, the cover flap is fusion welded to a bottom surface of the cover. In some embodiments, the anchor flap is fusion welded to the liner flap.

Some embodiments of the present apparatus comprise a first flap configured for attachment to a storage pond liner, a second flap configured for attachment to a storage pond cover, and a third flap configured for insertion into an anchor trench, wherein the first, second and third flaps are welded to one another. In some embodiments, all of the welds are fusion welds. In other embodiments, at least one of the welds is a fusion weld, or at least one of the welds is an extrusion weld. Some embodiments further comprise a storage pond liner for forming a storage basin, the storage pond liner being fusion welded to the first flap. Some embodiments further comprise a storage pond cover for covering a storage basin, the storage pond cover being fusion welded to the second flap. In some embodiments, the first flap is fusion welded to a top surface of the third flap. In some embodiments, the second flap is fusion welded to a top surface of the first flap Some embodiments of the present apparatus comprise a liner configured to form a storage basin, the liner having a perimeter, and a cover configured to cover the storage basin, the cover having a perimeter, wherein the outer perimeter of the liner and cover are welded together, and the outer perimeter of the liner and cover are configured for insertion into an anchor trench. In some embodiments, the weld is a fusion weld, or in other embodiments, an extrusion weld.

The term "coupled" is defined as connected, although not necessarily directly. The terms "a" and "an" are defined as one or more unless this disclosure explicitly requires otherwise.

The terms "substantially," "approximately," and "about" are defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

A device, system, or component of either that is configured in a certain way is configured in at least that way, but it can also be configured in other ways than those specifically described.

Any embodiment of any of the systems and methods can consist of or consist essentially of—rather than comprise/include/contain/have—any of the described elements, features, and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWING

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 4 is a sectional view of a detail of another embodiment of the present cover system and liquid storage pond showing the attachment of the cover system to the liner of the liquid storage pond.

DESCRIPTION OF ILLUSTRATIVE EMBODIMENTS

The following detailed description and drawings provide some non-limiting and non-exhaustive embodiments of the present cover systems. Embodiments of the present cover systems may be coupled to liquid storage ponds to cover liquid any liquids, such as or water, wastewater or manure comprising oil, such as petroleum that is extracted from the earth through a process like hydraulic fracturing.

Figure 1:
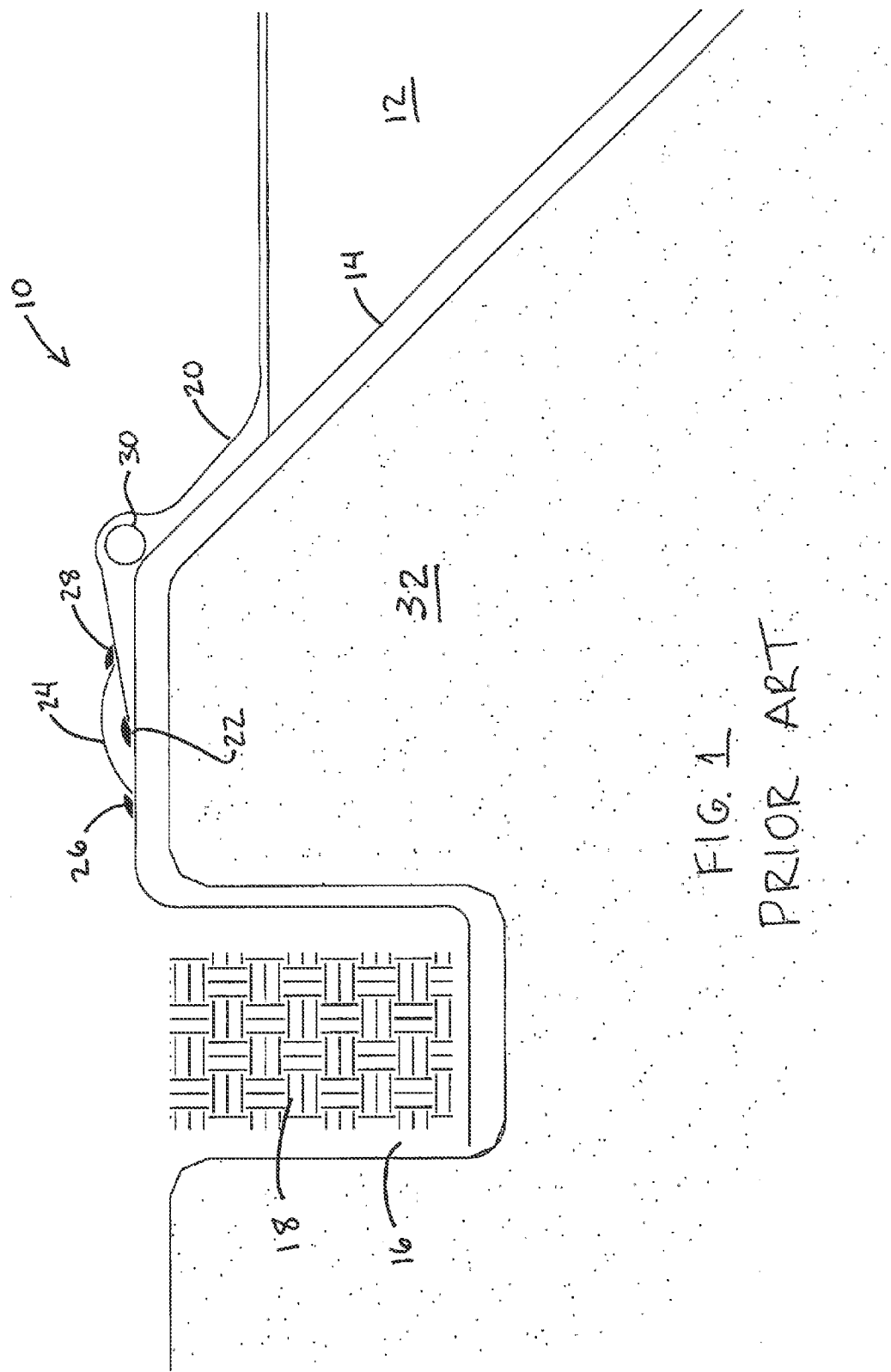
FIG. 1 is a sectional view of a detail of a prior art cover system and liquid storage pond showing the attachment of the cover system to the liner of the liquid storage pond.
Figure 2:
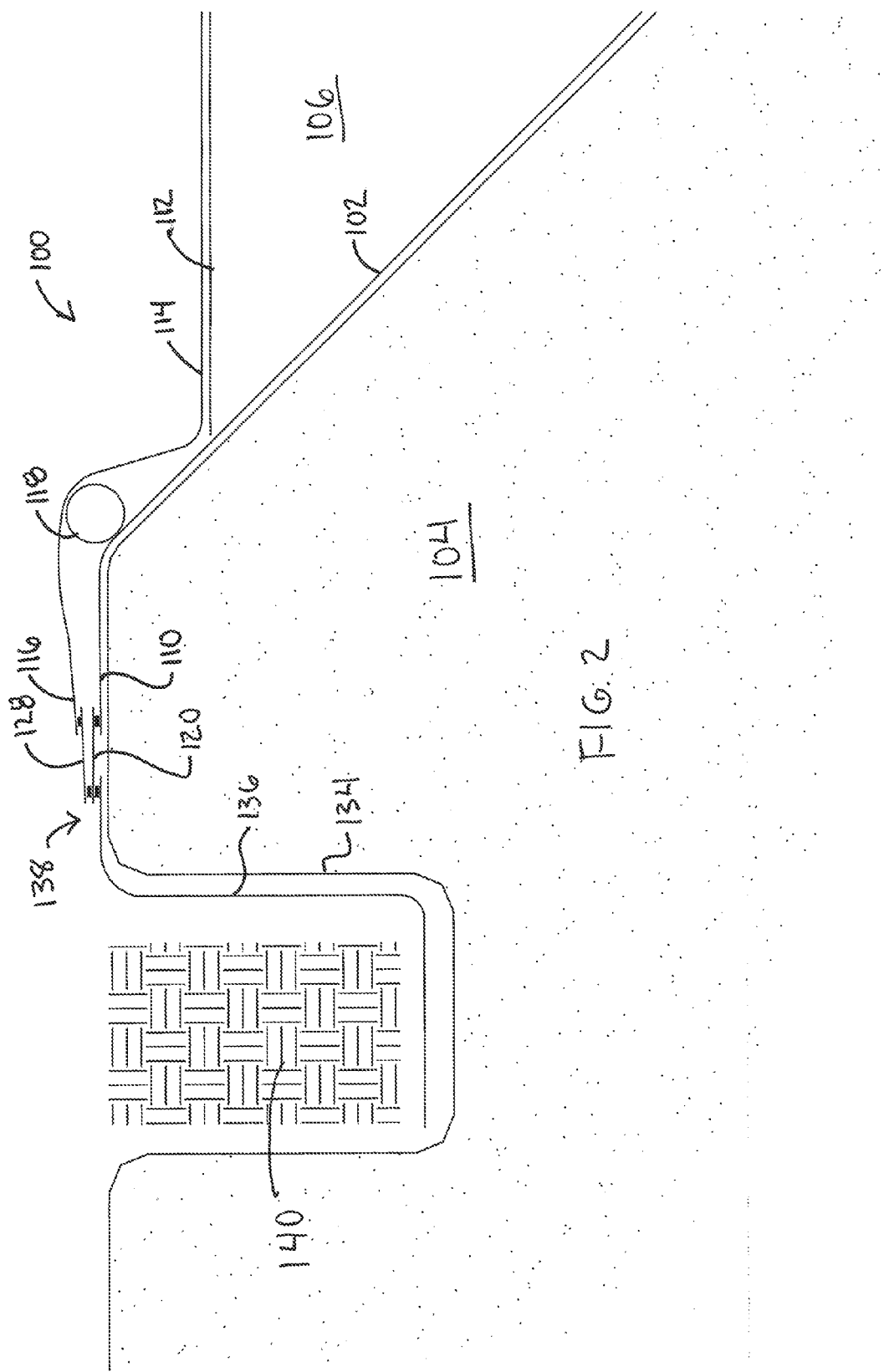
FIG. 2 is a sectional view of a detail of one embodiment of the present cover system and liquid storage pond showing the attachment of the cover system to the liner of the liquid storage pond.

Referring to FIG. 2, a cover system 100 comprises a liner 102 which is placed on a suitable supporting material, which is typically an earthen berm 104, to form a storage basin (or pond) 106 for holding a liquid. Liner 102 is formed of a substantially liquid impermeable material. One suitable material for liner 102 is a 60 mil ($^{60}/_{1000}$ inch thick) HDPE geomembrane, which is available in 22.3'×520' rolls from Solmax International, Inc. of Varennes, Quebec, Canada. Liner 102 may be formed of liner material which is seamed together using any suitable joining technique to form a liner which is wider than the width of available rolls. Liner 102 has an outer perimeter 110 which extends up the surface of earthen berm 104 above the highest expected liquid level 112.

A cover 114 covers the top of storage basin 106. Cover 114 floats on the surface of the liquid within storage basin 106. Cover 114 is formed of a substantially liquid and gas impermeable material. One suitable material for the cover is an 80 mil HDPE geomembrane, which is available in 22.3'×400' rolls from Solmax International, Inc. of Varennes, Quebec, Canada. The cover material may be seamed together using any suitable joining technique to form a cover which is wider than the width of available rolls. Cover 114 is configured so that an outer perimeter 116 of cover 114 is substantially aligned with outer perimeter 110 of liner 102. A perimeter pipe 118 may be placed between cover 114 and liner 102 around the perimeter of the storage pond and cover system 100. Perimeter pipe 118 is preferably a corrugated pipe to collect gases and allow gases to travel to a vent (not illustrated) for allowing gases to escape from under cover 114.

A liner flap 120 is provided with an inner edge and an outer edge. The inner edge of liner flap 120 is welded to outer perimeter 110 of liner 102. In the illustrated embodiment, liner flap 120 is welded to the top surface of liner 102, although it may also be welded to the bottom surface of liner 102. A cover flap 128 is provided with an inner edge and an outer edge. The inner edge of cover flap 128 is welded to outer perimeter 116 of cover 114. In the illustrated embodiment, cover flap 128 is welded to the bottom surface of cover 114, although it may also be welded to the top surface of cover 114.

Liner and cover flaps 120, 128 are formed of a substantially liquid and gas impermeable material. One suitable material for the cover is a 60 mil HDPE geomembrane, which is available in 22.3'×520' rolls from Solmax International, Inc. of Varennes, Quebec, Canada. In one embodiment, liner and cover flaps 120, 128 are about 1.5' wide and are substantially the same width (as shown in the embodiment illustrated in FIG. 2). However, liner and cover flaps 120, 128 can be of unequal width (as shown in the embodiment illustrated in FIG. 3). In one embodiment, liner flap 120 is 2.5' wide and cover flap is 1.5' wide, this is the preferred sizing. Per FIG. 3, when first welding liner flap 120 to liner 102, cover flap 128 is to the left, out of the way. Liner and cover flaps 120, 128 do not extend into an anchor trench 134 in the illustrated embodiment. Alternatively, they may extend, partially or fully, into anchor trench 134.

The outer edges of liner flap 120 and cover flap 120, 128 are substantially aligned with one another. An anchor flap 136 is welded to the outer edges of liner and cover flaps 120, 128. One suitable material for the anchor flap is the 60 mil HDPE geomembrane previously described. Anchor flap 136 is wide enough to extend from the outer perimeter of the flaps into and across the bottom of an anchor trench 134 (at a minimum). Anchor trench 134 is backfilled with backfill material 140 to maintain the cover system 100 in position. Liner flaps and cover flap 120, 128 may be placed together and anchor flap 136 may be placed under the flaps (FIG. 3) or on top of liner flap and cover flap 120, 128 (not illustrated).

Figure 3:
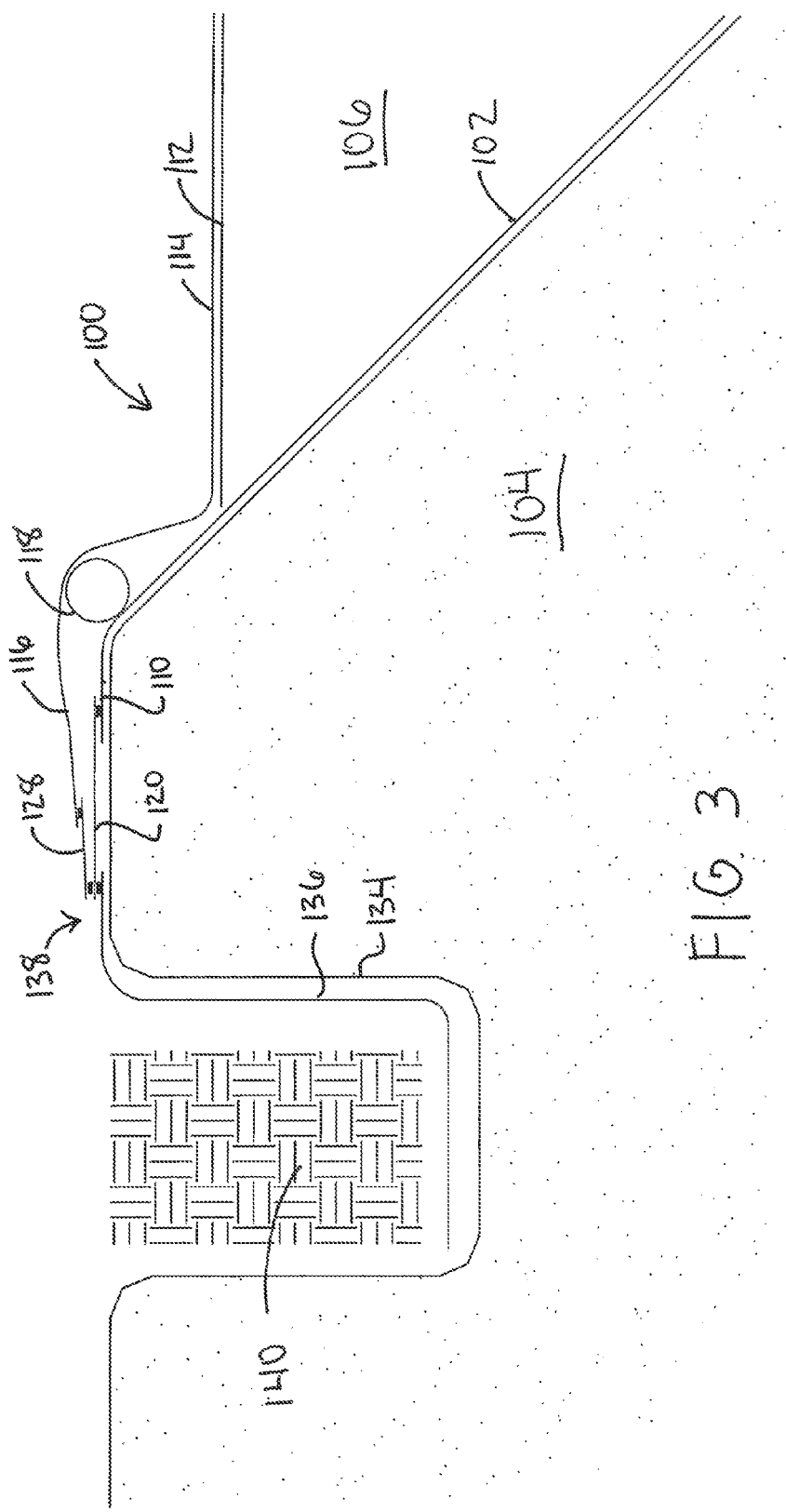
FIG. 3 is a sectional view of a detail of another embodiment of the present cover system and liquid storage pond showing the attachment of the cover system to the liner of the liquid storage pond.

An exemplary method of assembling and installing the cover system of FIGS. 2 and 3 will now be described. Liner, cover and anchor flaps 120, 128 and 136 are cut to the required widths and lengths (for example, anchor trench flap 136 may be about 6 feet wide; cover flap 120 may be 1.5 feet wide, and liner flap 128 may be about 2.5 feet wide). All three flaps are cut to about the same length. For example, liner, cover and anchor flaps 120, 128 and 136 may all be about 200 feet long to run along one side of the perimeter of the storage basin 106.

The cover system may be assembled in sections which are then connected together to form the entire storage basin. For example, a large, rectangular storage basin may be 1000 feet by 500 feet, for a total perimeter length of 3000 feet. The liner, cover and anchor flaps 120, 128 and 136 may be assembled in shorter lengths to make up the 3000 feet perimeter. For example, 150 feet sections may be used for the long runs along the edges of the storage basin. Shorter sections, such as 10, 15 or 20 feet sections may be used at the corners. These shorter sections may be easier to manipulate and maneuver during construction, and a user may choose any desired length. Each of the sections is connected to the adjacent section to form a liquid and/or gas tight seal using techniques known to those skilled in the art, for example, butt welding.

After the pieces are cut to the proper length and width, cover flap 128 and liner flap 120 are welded together along one side of the two flaps. In one exemplary embodiment, they are welded on the outside edges of the two flaps. Anchor trench flap 136 is then welded to the cover/liner flap assembly to form a three flap assembly 138. This weld may be aligned with the weld between the cover and the liner flap. The welded area may be about 3" wide. Alternatively, the three flaps may be welded together simultaneously using two fusion—wedge welding machines at the same time, with one welder about 10 feet behind the other.

The fusion weld may be performed using any fusion welder. In one embodiment, a split wedge fusion welder is used. The use of a split wedge allows air pressure seam testing, which is convenient and quick. Suitable wedge welders are commercially available from sources such as DemTech Services, Inc. of Diamond Springs, Calif. Such machines can move at rapid rates, such as 10 feet per minute (14 feet per minute maximum with current equipment), which is as much as sixty times faster than an extrusion weld. Moreover, fusion welds rarely leak.

Three flap assembly 138 can be fabricated in a factory environment or on site. Fabricating at a factory allows for a controlled environment and controlled temperatures, thereby avoiding weather issues which can cause field fabrication issues. One drawback to fabricating off site is the extra shipping costs from the factory to the assembly site.

To install the system after three flap assembly 138 has been assembled, anchor trench flap 136 is placed in anchor trench 134, and the anchor trench is backfilled. Liner flap 120 is then welded to liner 102 as the liner is deployed. Cover flap 128 is then welded to cover 114 as the cover is deployed.

It should be understood that fusion welding is preferably used for all or the bulk of the welding described herein. However, it is also possible to perform any of the welds using other welding techniques, such as extrusion welding. Furthermore, additional welding techniques, such as extrusion welding, may be necessary for touch up or detail work where fusion welding may not be practicable.

FIG. 4 shows another embodiment of a pond cover system 200. In this embodiment, a liner 202 and a cover 204 are configured so that they are capable of extending into an anchor trench 206. The outer perimeter of liner 202 and cover 204 are welded to one another. The welded perimeter is then placed into anchor trench 206, and anchor trench 206 is backfilled to hold liner 202 and cover 204 into place.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted (e.g., threads may be substituted with press-fittings or welds). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A cover system comprising:
   a cover;
   a liner, the liner being configured so that, when the cover system is used, at least a portion of the liner will be disposed under at least a portion of the cover;
   a first flap welded to the liner;
   a second flap welded to the cover, the second flap also welded to the first flap; and
   a third flap welded to either the first flap or the second flap.

2. The cover system of claim 1, wherein all of the welds are fusion welds.

3. The cover system of claim 1, wherein at least one of the welds is a fusion weld.

4. The cover system of claim 3, wherein at least one of the welds is an extrusion weld.

5. The cover system of claim 1, where the first flap is fusion welded to a top surface of the liner.

6. The cover system of claim 1, where the second flap is fusion welded to a bottom surface of the cover.

7. The cover system of claim 1, where the third flap is fusion welded to the first flap.

8. A pond cover system comprising:
   a liner configured to form a storage pond;
   a cover configured to cover the liner;
   a liner flap welded to the liner;

a cover flap welded to the cover and the liner flap; and
an anchor flap welded to either the liner flap or cover flap.

9. The cover system of claim 8, wherein all of the welds are fusion welds.

10. The cover system of claim 8, wherein at least one of the welds is a fusion weld.

11. The cover system of claim 10, wherein at least one of the welds is an extrusion weld.

12. The pond cover system of claim 8, wherein the liner flap is fusion welded to a top surface of the liner.

13. The pond cover system of claim 8, wherein the cover flap is fusion welded to a bottom surface of the cover.

14. The pond cover system of claim 8, wherein the anchor flap is fusion welded to the liner flap.

15. A covered storage pond system comprising:
    a liner for forming a storage pond, the liner having a perimeter;
    a cover for covering the storage pond, the cover having a perimeter;
    a flap preassembly comprising:
       a liner flap;
       a cover flap; and
       an anchor flap, wherein the liner, cover and anchor flaps are welded to each other, the perimeter of the liner is welded to the liner flap and the perimeter of the cover is welded to the cover flap.

16. The covered storage pond system of claim 15, wherein all of the welds are fusion welds.

17. The covered storage pond system of claim 15, wherein at least one of the welds is a fusion weld.

18. The covered storage pond system of claim 17, wherein at least one of the welds is an extrusion weld.

19. The covered storage pond system of claim 15, wherein the liner flap is fusion welded to a top surface of the liner.

20. The covered storage pond system of claim 15, wherein the cover flap is fusion welded to a bottom surface of the cover.

21. The covered storage pond system of claim 15, wherein the anchor flap is fusion welded to the liner flap.

22. A kit for forming a pond storage system comprising:
    a first flap configured for attachment to a storage pond liner;
    a second flap configured for attachment to a storage pond cover;
    a third flap configured for insertion into an anchor trench, wherein the first, second and third flaps are welded to one another; and
    a storage pond liner for forming a storage basin, the storage pond liner being fusion welded to the first flap.

23. The kit of claim 22, wherein all of the welds are fusion welds.

24. The kit of claim 22, wherein at least one of the welds is a fusion weld.

25. The kit of claim 24, wherein at least one of the welds is an extrusion weld.

26. The kit of claim 22, further comprising a storage pond cover for covering the storage basin, the storage pond cover being fusion welded to the second flap.

27. The kit of claim 22, wherein the first flap is fusion welded to a top surface of the third flap.

28. The kit of claim 22, wherein the second flap is fusion welded to a top surface of the first flap.

* * * * *